United States Patent
Peralta et al.

(10) Patent No.: US 11,784,304 B2
(45) Date of Patent: Oct. 10, 2023

(54) POSITIVE ELECTRODE MATERIAL BASED ON A LITHIATED LAYERED OXIDE COATED, IN WHOLE OR IN PART, WITH ANOTHER MANGANESE-BASED OXIDE, AND METHOD FOR THE PREPARATION THEREOF

(71) Applicant: COMMISSARIAT À L'ÉNERGIE ATOMIQUE ET AUX ÉNERGIES ALTERNATIVES, Paris (FR)

(72) Inventors: David Peralta, Grenoble (FR); Carole Bourbon, Saint Michel de Saint-Geoirs (FR); Jean-François Colin, Meylan (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 67 days.

(21) Appl. No.: 16/478,699

(22) PCT Filed: Jan. 18, 2018

(86) PCT No.: PCT/FR2018/050129
§ 371 (c)(1),
(2) Date: Jul. 17, 2019

(87) PCT Pub. No.: WO2018/134531
PCT Pub. Date: Jul. 26, 2018

(65) Prior Publication Data
US 2019/0372112 A1  Dec. 5, 2019

(30) Foreign Application Priority Data

Jan. 19, 2017 (FR) ...................................... 1750437

(51) Int. Cl.
*H01M 4/36* (2006.01)
*C01G 53/00* (2006.01)
(Continued)

(52) U.S. Cl.
CPC ............ *H01M 4/366* (2013.01); *C01G 53/50* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2014/0087245 A1   3/2014   Lee et al.
2016/0164088 A1   6/2016   Peralta et al.

FOREIGN PATENT DOCUMENTS

WO   2012093239 A1   7/2012
WO   2015010255 A1   1/2015

OTHER PUBLICATIONS

Yabuuchi et al. Adv. Energy Mater. 2014, 4, 1301453 (Year: 2014).*
Chem. Mater. 2003, 15, 4456-4463 (Year: 2003).*
Search Report for French Application No. 1750437 dated Oct. 5, 2017.
International Search Reprot for PCT/FR2018/050129 dated Feb. 27, 2018.
(Continued)

*Primary Examiner* — Lucas J. O'Donnell
(74) *Attorney, Agent, or Firm* — Pearne & Gordon LLP

(57) ABSTRACT

Positive electrode material for a lithium battery comprises a lithiated metal layered oxide comprising metal elements arranged in layers of metal cations and lithium arranged in interlayers of lithium cations and, in part, in the layers of metal cations, the oxide has a stack arrangement 02 and corresponds to the formula (I): Li(a+b)NicMndCoeMfOg (I)
(Continued)

wherein: *a represents the proportion of lithium in the interlayers, $0<a<1$; *b represents the proportion of lithium in the layers of metal cations, $0<b<⅓$; *c, d, e and f are between 0 and 1 and $b+c+d+e+f=1$; *$1.9<g<2.1$; *when $f\neq 0$, M is one or more of Al, Fe, Ti, Cr, V, Cu, Mg, Zn, Na, K, Ca, Sc; wherein the oxide is coated with an oxide of the formula (II): $Mn_hM'_iO_2$ (M) wherein: *$0<h\leq 1.5$, preferably $h=1$; *M' is one or more of Ni, Al, Fe, Ti, Cr, V, Cu, Mg, Zn, Na, K, Ca, Sc; *$0\leq i\leq 1.5$.

12 Claims, 2 Drawing Sheets

(51) Int. Cl.
    *H01M 4/505*     (2010.01)
    *H01M 4/525*     (2010.01)
    *H01M 10/0525*     (2010.01)
    *H01M 4/02*     (2006.01)

(52) U.S. Cl.
    CPC ..... *H01M 10/0525* (2013.01); *C01P 2006/40* (2013.01); *H01M 2004/028* (2013.01)

(56) References Cited

OTHER PUBLICATIONS

Xiantong, Guan et al. "Enhancing the electrochemical performance of Li1.2Ni0.2Mn0.6O2 by surface modification with nickel-maganese coposite oxide" IN: Journal of Solid State Electrochemistry, Apr. 7, 2013, vol. 17, No. 7, pp. 2087-2093.

Yunjian, Liu et al. "Influence of Coated mNo2 Content on The Electrochemical Performance of Li1.2Ni0.2 Mn0602 cathodes" IN: Ionics, Dec. 18, 2013, vol. 20, No. 6, pp. 825-831.

Wang, Chih-Chieh et al. Effect of Synthesis Conditions on the First Charge and Reversible Capacities of Lithium-Rich Layered Oxide Cathodes: IN: Chemistry of Materials, Jul. 5, 2013, vol. 25, No. 15, pp. 3267-3275.

Kim D et al., High-energy and high power Li-rich nickel manganese oxide electrode materials: IN: Electrochemistry Communications, Elsevie, Nov. 1, 2010, vol. 12, No. 11, pp. 1618-1621.

Wei, Fanglin et al., "Review—Research Progress on Layered Transition Metal Oxide Cathode Materials for Sodium Ion Batteries", Journal of The Electrochemical Society, May 14, 2021, 168, 050524.

* cited by examiner

POSITIVE ELECTRODE MATERIAL BASED ON A LITHIATED LAYERED OXIDE COATED, IN WHOLE OR IN PART, WITH ANOTHER MANGANESE-BASED OXIDE, AND METHOD FOR THE PREPARATION THEREOF

CROSS-REFERENCE TO RELATED APPLICATIONS

This is a National Stage application of PCT international application PCT/FR2018/050129, filed on Jan. 18, 2018, which claims the priority of French Patent Application No. 17 50437, filed Jan. 19, 2017, both of which are incorporated herein by reference in their entireties.

TECHNICAL FIELD

The present invention relates to new materials and, more specifically to new positive electrode materials based on a lithiated layered oxide coated, in whole or in part, with another manganese-based oxide as well as a method for preparing these materials. These materials have their application in the field of lithium batteries and, more specifically, lithium-ion batteries.

Lithium-ion batteries are particularly interesting for fields where autonomy is an essential criterion, such as is the case in the field of nomadic devices (such as mobile telephones, portable computers) or in the field of transport such as electric vehicles, hybrid vehicles, or in the medical, space or microelectronics fields.

From a functional standpoint, lithium-ion batteries are based on the principle of the intercalation-deintercalation of the lithium within materials that form electrodes of the electrochemical cells of the battery.

More precisely, the reaction at the origin of the production of current (i.e. when the battery is in discharge mode) implements the transfer, by the intermediary of an electrolyte that conducts lithium ions, lithium cations coming from a negative electrode that is inserted into the acceptor network of the positive electrode, while electrons coming from the reaction to the negative electrode will supply the outer circuit, to which are connected the positive and negative electrodes.

In lithium-ion batteries, the most critical and the most limiting element is the positive electrode and, more specifically, the active material of the positive electrode. Indeed, it is the properties of the active material of the positive electrode that will determine the energy density, the voltage and the service life of the battery.

In order to increase the energy density, new positive electrode active materials have been the subject of research and, in particular materials of the layered oxide family, such as:
- mixed oxides $Li(Ni,Co,Mn)O_2$ (and more specifically $Li(Ni_{1/3}Mn_{1/3}Co_{1/3})O_2$), with these oxides also being known under the name NMC;
- oxides $Li(Ni, Co, Al)O_2$ (and more specifically $Li(Ni_{0.8}Co_{0.15}Al_{0.05}O_2)$), with these oxides also being known under the name NCA.

More specifically, the oxide of formula $Li(Ni_{1/3}Mn_{1/3}Co_{1/3})O_2$ is, today, used to manufacture batteries intended for electric cars, while the oxide of formula $Li(Ni_{0.8}Co_{0.15}Al_{0.05}O_2)$ has recently been marketed and makes it possible to obtain electrochemical cells that have a very high energy density.

It is also considered to be able to use, as positive electrode active materials, materials that belong to the category of lithiated layered oxides and, more precisely, overlithiated layered oxides, in particular for applications that require the use of batteries with a very high density. However, these materials have various technological barriers and, in particular, that of the modification of the structure of the material during cycling, which can result in a drop in the average potential of the battery during the cycles.

The materials of the layered oxide type, such as lithiated layered oxides, are characterised by the stack of layers of formula $[MO_2]$ (M designating the metal element or elements) comprised of associated octahedra, while the lithium is placed, in whole or in part, between said layers (or, in other terms, in interlayers). According to the symmetry of the environment of the lithium, a structural classification has been proposed defined by the abbreviations O3 and O2 (referred to also as stack of the O3 type or of the O2 type).

Pour the stack of the O3 type, the $Li^+$ ions occupy octahedral sites that share edges with the $MO_6$ octahedrons (M designating the metal element or elements) that form the aforementioned layers.

With regards to the stack of the O2 type, the $Li^+$ ions occupy octahedral sites that share faces and edges with the $MO_6$ octahedrons (M designating the metal element or elements) that form the aforementioned layers.

For the stack of the O3 type, when the material is charged in particular beyond 4.3 V, metal cations will migrate from octahedral sites of the metal layer to the lithium interlayer, which corresponds to a destructuring of the material inducing a drop in the average potential of the battery.

On the other hand, for the stack of the O2 type, inverting the direction of the octahedrons of the metal layers in relation to the O3 type makes unfavourable the migration of the metal cations to the lithium interlayer. The change in the structure over the cycles is then curbed and the fall in the potential is limited.

Also, lithiated layered oxides of the O2 type are more advantageous and this is the reason why certain authors have set up methods for preparing such oxides in particular via ion exchange with a sodium-based precursor, such as in *Electrochemistry Communications* 12 (2010) 1618-1621, wherein an overlithiated layered oxide of formula $Li_x(Ni_{0.25}Mn_{0.75})O_y$ (x>1) of the O2 type is prepared using a sodium-based precursor $Na_{0.9}Li_{0.3}Ni_{0.25}Mn_{0.75}O_\delta$, which is subjected to an ion exchange reaction in order to replace the sodium ions with lithium ions by putting it into contact with a lithium salt LiBr with a prior preparation of said precursor by mixing and heating of powders of $Ni_{0.25}Mn_{0.75}CO_3$, of $Na_2CO_3$ and of $Li_2CO_3$.

Although the lithiated layered oxides of the O2 type have a structure that does not change over conventional cyclings, these oxides placed in a high-temperature environment can undergo a structure modification, which generates a transformation of the type O2 into type O3 and thus a structure that is not stable in cycling.

In light of what exists, the authors of this invention have proposed to develop new positive electrode materials based on a lithiated layered oxide of the O2 type of which the electrochemical behaviour is improved and of which the method of preparation does not induce a structure modification of this oxide.

DISCLOSURE OF THE INVENTION

The authors of this invention have discovered that by adding to a lithiated layered oxide of the O2 type a specific coating it is possible to substantially improve the electrochemical properties of the resulting material (in particular, an increase in the capacity for all charge/discharge rates) and have also discovered a method for preparing such a material without the latter degrading the lithiated layered oxide of the O2 type.

Thus, the invention relates to a positive electrode material for a lithium battery comprising a lithiated metal layered oxide comprising one or more metal elements arranged in the form of layers of metal cations (namely, cations of Ni, Mn, Co, M with regards to the formula (I) hereinbelow) and lithium arranged in interlayers of lithium cations and, in part, in the layers of metal cations, said interlayers ensuring the separation between said layers, said oxide having a stack arrangement O2 and corresponding to the following formula (I):

$$Li_{(a+b)}Ni_cMn_dCo_eM_fO_g \quad (I)$$

wherein:
* a represents the proportion of lithium included in the interlayers and being greater than 0 and less than or equal to 1;
* b represents the proportion of lithium included in the layers of metal cations and being greater than 0 and less than or equal to (1/3);
* c, d, e and f are between 0 and 1, with the condition that b+c+d+e+f=1, in such a way that the electroneutrality of the oxide of formula (I) is respected;
* g is between 1.9 and 2.1, for example, is equal to 2;
* when f is different from 0, M is at least one element selected from Al, Fe, Ti, Cr, V, Cu, Mg, Zn, Na, K, Ca, Sc and the combinations thereof;

characterised in that said oxide is coated, in whole or in part, with an oxide of the following formula (II):

$$Mn_hM'_iO_2 \quad (II)$$

wherein:
* $0 < h \leq 1.5$, preferably equal to 1;
* M' is at least one element selected from Ni, Al, Fe, Ti, Cr, V, Cu, Mg, Zn, Na, K, Ca, Sc
* $0 \leq i \leq 1.5$.

For a better understanding of the invention, in the appendix, for the purposes of illustration and in a non-limiting manner, a FIG. 1 is provided that diagrammatically shows a stack of the O2 type in accordance with the invention comprising octahedron layers occupied, at the centre thereof, by metal cations (for example, Ni or Mn) numbered 1, 3, 5 and 7 separated by interlayers 9, 11 and 13, of which the octahedrons are occupied at the centre thereof by lithium cations, with each layer comprising one of these octahedrons occupied in at the centre thereof by a lithium cation, with the other octahedrons being occupied at the centre thereof by metal cations (for example, Ni or Mn).

According to a particular embodiment of the invention, e and f can be equal to 0, in which case the lithiated layered oxide corresponds to the following formula (III):

$$Li_{(a+b)}Ni_cMn_dO_g \quad (III)$$

with a, b, c and d being such as defined hereinabove.

With regards to the indexes b, c and d, they respond in this case to the relation b+c+d=1 with the condition that b, c and d are different from 0. In any case, it is understood, generally, that the values of b, c and d will be chosen in such a way that the compound of formula (III) is electrically neutral.

A specific oxide in accordance with the definition of the oxides of the aforementioned formula (III) is the oxide of the following formula (IV) (with a=1, b=0.2, c=0.2, d=0.6 and g=2):

$$Li_{1.2}Ni_{0.2}Mn_{0.6}O_2 \quad (IV)$$

Specifically and advantageously, (a+b) can be greater than 1, in which case the layered oxide belongs to the category of overlithiated layered oxides.

According to a particular embodiment of the invention, h can be equal to 1 and i can be equal to 0, in which case the oxide covering the lithiated layered oxide corresponds to the formula $MnO_2$ and is therefore manganese oxide (IV).

More specifically, the material of the invention can have the form of particles formed by the lithiated metal layered oxide having a stack of the O2 type, said particles being coated with a layer of coating formed by the oxide of the aforementioned formula (II).

In other terms, the material of the invention can be defined as having the form of particles comprising a core formed by the lithiated layered oxide having a stack of the O2 type and a layer of coating formed by the oxide of the aforementioned formula (II) surrounding said core.

The ratio (lithiated layered oxide/layer of coating) can vary in the following molar proportions: 99.9% lithiated layered oxide/0.1% layer of coating to 90% lithiated layered oxide/10% layer of coating.

As its name indicates, the material of the invention is a positive electrode material for a lithium battery and more specifically for a lithium-ion battery. It is therefore entirely naturally intended to enter into the constitution of a lithium battery.

Thus, the invention also relates to a lithium battery comprising at least one electrochemical cell comprising an electrolyte arranged between a positive electrode and a negative electrode, said positive electrode comprising a material in accordance with the invention.

The term positive electrode means, conventionally, in the above and in what follows, the electrode that acts as a cathode, when the generator is delivering current (i.e. when it is in the discharge process) and acts as an anode when the generator is in the charge process.

The term negative electrode means, conventionally, in the above and in what follows, the electrode that acts as an anode, when the generator is delivering current (i.e. when it is in the discharge process) and which acts as a cathode, when the generator is in the charge process.

The negative electrode can be, for example, lithium in metallic form, or can be a material that can be inserted and removed from the lithium, such as a carbon material such as graphite, an oxide material such as $Li_4Ti_5O_{12}$ or a compound able to form an alloy with lithium, such as silicon or tin.

The positive electrode can include, in addition to the material in accordance with the invention, a binder and an electronic conductive additive, such as carbon.

The electrolyte can include, in general, a lithium salt, for example, selected from LiClO$_4$, LiAsF$_6$, LiPF$_6$, LiBF$_4$, LiRfSO$_3$, LiCH$_3$SO$_3$, LiN(RfSO$_2$)$_2$, Rf being selected F or a perfluoroalkyl group comprising from 1 to 8 carbon atoms, lithium trifluoromethanesulfonylimide (known under the abbreviation LiTfSI), lithium bis(oxalato)borate (known under the abbreviation LiBOB), lithium bis(perfluoroethylsulfonyl)imide (also known under the abbreviation LiBETI), lithium fluoroalkylphosphate (known under the abbreviation LiFAP).

The lithium salt is, preferably, dissolved in an aprotic polar solvent.

Furthermore, the electrolyte can be led to soak a separator element arranged between the two electrodes of the accumulator.

In the case of a lithium battery comprising a polymer electrolyte, the lithium salt is not dissolved in an organic solvent, but in a solid polymer composite, such as ethylene polyoxide (known under the abbreviation POE), polyacrylonitrile (known under the abbreviation PAN), methyl polymethacrylate (known under the abbreviation PMMA), polyvinylidene fluoride (known under the abbreviation PVDF), polyvinylidene chloride (known under the abbreviation PVC) or one of the derivatives thereof.

The material of the invention must be, advantageously, prepared in operating conditions that allow for the depositing of the oxide of formula (II) over all or a portion of the lithiated layered oxide of formula (I) without generating modifications of the O2 type of said oxide (for example, modification of the O2 type to the O3 type).

Thus, the authors of this invention have developed a method for preparing a positive electrode material for a lithium battery comprising a lithiated metal layered oxide comprising one or more metal elements arranged in the form of layers of metal cations (namely, cations of Ni, Mn, Co, M with regards to the formula (I) hereinbelow) and lithium arranged in interlayers of lithium cations and, in part, in the layers of metal cations, said interlayers ensuring the separation between said layers, said oxide having a stack arrangement O2 and corresponding to the following formula (I):

$$\text{Li}_{(a+b)}\text{Ni}_c\text{Mn}_d\text{Co}_e\text{M}_f\text{O}_g \tag{I}$$

wherein:
  *a represents the proportion of lithium included in the interlayers and being greater than 0 and less than or equal to 1;
  *b represents the proportion of lithium included in the layers of metal cations and being greater than 0 and less than or equal to (⅓);
  *c, d, e and f are between 0 and 1, with the condition that b+c+d+e+f=1, in such a way that the electroneutrality of the oxide of formula (I) is respected;
  *g is between 1.9 and 2.1, for example, is equal to 2;
  *when f is different from 0, M is at least one element selected from Al, Fe, Ti, Cr, V, Cu, Mg, Zn, Na, K, Ca, Sc and the combinations thereof;

said oxide being coated, in whole or in part, with an oxide of the following formula (II):

$$\text{Mn}_h\text{M}'_i\text{O}_2 \tag{II}$$

wherein:
  *0<h≤1.5, preferably equal to 1;
  *M' is at least element selected from Ni, Al, Fe, Ti, Cr, V, Cu, Mg, Zn, Na, K, Ca, Sc;
  *0≤i≤1.5;

said method comprising the following steps:
  a) a synthesis step of the lithiated layered oxide having a stack of the O2 type;
  b) a synthesis step of the oxide of formula (II) over all or a portion of the lithiated layered oxide.

More precisely, the synthesis step of the lithiated layered oxide having a stack of the O2 type comprises the following operations:
  i) a synthesis operation of a mixed carbonate or of a mixed hydroxide comprising the other elements than Li by putting into contact, under agitation, elements other than Li in the form of cations with carbonate anions, when it entails synthesising the mixed carbonate, or with hydroxide anions, when it entails synthesising mixed hydroxide;
  ii) a synthesis operation of an oxide of formula Na$_x$Li$_y$Ni$_c$Mn$_d$Co$_e$M$_f$O$_g$ with x being between 0 and 1 (more preferably, between 0.5 and 0.8), γ being between 0 and 1 (more preferably, between 0.01 and ⅓), c, d, e, f, g and M being such as defined hereinabove, said oxide having a stack of the P2 type, by reaction of the mixed carbonate obtained in the step i) with a lithium carbonate/sodium carbonate mixture or by reaction of the mixed hydroxide obtained in the step i) with a lithium hydroxide/sodium hydroxide mixture;
  iii) an operation of exchanging the sodium of the oxide obtained in ii) with lithium, whereby results the lithiated layered oxide having a stack of the O2 type.

Regarding the operation i), it is specified that, by mixed carbonate comprising the elements other than Li, this is a compound comprising a CO$_3^{2-}$ anion and cations of the elements other than Li (namely, the element presents in the oxide excluding Li, which is subsequently introduced).

By mixed hydroxide comprising the elements other than Li, it is specified that it is a compound that comprises an OH$^-$ anion and cations of the elements other than Li (namely, the elements present in the oxide excluding Li, which is subsequently introduced).

When it is chosen to carry out the synthesis of a mixed carbonate (also referred to as the carbonate route), the operation i) thus consists in placing into contact, under agitation, the elements other than Li in the form of cations with carbonate anions.

More specifically, the elements other than Li in the form of cations can be provided via a solution comprising salts of the elements other than Li (for example, nickel sulphate, manganese sulphate, cobalt sulphate and M sulphate or nickel nitrate, manganese nitrate, cobalt nitrate and M nitrate), while the carbonate anions can be provided via a solution that comprises an alkali metal carbonate (such as sodium carbonate Na$_2$CO$_3$). It can be considered to adjust the quantity of alkali metal carbonate added, in such a way that a portion of the latter contributes to adjusting the pH in a range that can be, for example, from 6.5 to 8.5, more preferably equal to 7.5.

When it is chosen to carry out the synthesis of a mixed hydroxide (also referred to as the hydroxide route), the step a) consists in putting into contact, under agitation, the elements other than Li in the form of cations with hydroxide anions.

More specifically, the elements other than Li in the form of cations can be provided via a solution comprising sulphates of elements other than Li (for example, nickel sulphate, manganese sulphate, cobalt sulphate and M sulphate or nickel nitrate, manganese nitrate, cobalt nitrate and M nitrate), while the hydroxide anions can be provided via a solution comprising an alkali metal hydroxide (such as soda NaOH). It can be considered to adjust the quantity of alkali metal hydroxide added, in such a way that a portion of the latter contributes in adjusting the pH in a range that can be, for example, from 9 to 11, more preferably equal to 10.

Without being bound by theory, the synthesis step of a mixed carbonate or of a mixed hydroxide consists in a mechanism of coprecipitation of the cations of elements other than Li with the carbonate or hydroxide anions, whereby results the mixed carbonate or the mixed hydroxide.

More specifically, the synthesis step of a mixed carbonate or of a mixed hydroxide can consists in coprecipitating under agitation, in a basic medium (for example, a medium comprising ammonia), a solution comprising the ions of elements other than Li (with this solution able to be obtained by dissolution of salts of the sulphate, nitrate or other type) and a solution comprising a alkali salt carbonate (for example, sodium carbonate), when it entails preparing a mixed carbonate or a alkali salt hydroxide (for example, sodium hydroxide), when it entails preparing a mixed hydroxide.

Even more specifically, the synthesis step of a mixed carbonate or of a mixed hydroxide can include the following operations:
  an operation of injecting, into a reactor (for example, a reactor of the CSTR type) comprising water, a solution comprising the ions of elements other than Li (referred to as metallic solution) and a solution of a carbonate (for example, an alkali metal carbonate) or a hydroxide (for example, an alkali metal hydroxide) with a predetermined agitation speed and with a predetermined pH;
  an operation for maintaining the agitation of the precipitate formed during a suitable duration for the complete formation of the mixed carbonate or of the mixed hydroxide;
  an operation of isolating the precipitate followed by an operation of drying, whereby there subsists a powder of mixed carbonate or of mixed hydroxide.

In the framework of this embodiment, the influencing operation conditions are the aforementioned pH and the agitation speed (with these conditions being mentioned hereinabove by the expressions "predetermined pH" and "predetermined agitation speed").

Advantageously, the pH operating conditions can be set in the following way:
  *in the case of a synthesis that uses soda as the precipitating solution with the purpose of obtaining a mixed hydroxide, the pH can be set to a value between 9 and 11.5 and preferentially equal to 10;
  *in the case of a synthesis that uses a carbonate (for example, $Na_2CO_3$) as the precipitating solution for the purpose of obtaining a mixed carbonate, the pH can be set to a value between 6.5 and 8.5 and preferentially equal to 7.5.

With regards to the agitation speed, it can be, advantageously selected:
  when it entails preparing a mixed hydroxide, in such a way as to dissipate a power between 10 and 10,000 $W/m^3$, more preferably greater than 500 $W/m^3$;
  when it entails preparing a mixed carbonate, in such a way as to dissipate a power between 10 and 10,000 $W/m^3$, more preferably less than 500 $W/m^3$, more preferably 2.0 $W/m^3$ to 253.2 $W/m^3$ and, more preferentially, from 2.0 $W/m^3$ to 100 $W/m^3$.

Furthermore, the operation of synthesising a mixed carbonate or a mixed hydroxide can be set to a temperature ranging from 30 to 70° C., for example, a temperature of 50° C.

Finally, the concentration of the solution comprising the ions of the elements other than Li can range from 0.8 to 3 M, for example, a concentration of 2 M.

The mixed carbonate or mixed hydroxide thus prepared can thus be washed and subjected to an operation of insulating, for example, by filtration and an operation of drying (for example, in a vacuum, for one night).

The mixed carbonate obtained corresponds to the following formula $Ni_cMn_dCo_eM_fCO_3$ with c, d, e and f being such as defined hereinabove, while the mixed hydroxide obtained corresponds to the following formula $Ni_cMn_dCo_eM_f(OH)_2$ with c, d, e and f being such as defined hereinabove.

Once the mixed carbonate or the mixed hydroxide is carried out, the latter is set to react with a lithium carbonate/sodium carbonate mixture, when it entails mixed carbonate or with a lithium hydroxide/sodium hydroxide mixture, when it entails mixed hydroxide, whereby an oxide of formula $Na_xLi_yNi_cMn_dCo_eM_fO_g$ is obtained with x being between 0 and 1 (more preferably, between 0.5 and 0.8), y being between 0 and 1 (more preferably, between 0.01 and ⅓), c, d, e, f, g and M being such as defined hereinabove, with said oxide having a stack of the P2 type.

Conventionally, this reaction is carried out dry with the reagents having the form of powders and by applying to the mixture of powders a heat treatment of calcination at a temperature and a duration that allows for the obtaining of the oxide of formula $Na_xLi_yNi_cMn_dCo_eM_fO_g$. The calcination temperature can be between 700° C. and 1000° C., more preferably is equal to 850° C. The calcination duration can be between 1 hour and 50 hours, preferably, between 10 hours and 24 hours. An additional step during the calcination can be carried out, in such a way as to reach a temperature plateau. The temperature of this gradient can be between 300° C. and 700° C., preferably, between 400° C. and 500° C. The duration of this plateau can be between 1 hour and 24 hours, preferably, between 5 hours and 10 hours. These associated conditions of temperature and of duration can be determined by those skilled in the art through the bias of prior tests, with the obtaining of the desired product (here, the aforementioned oxide of formula and having the stack of the P2 type) able to be detected by X-ray scattering.

Finally, the oxide prepared in the operation ii) is intended to undergo an operation of exchanging sodium with lithium, whereby results the lithiated layered oxide having a stack of the O2 type.

Several methods of ion exchange can be considered to exchange the sodium with lithium, such as:
  the method of ion exchange in a melted salt medium by the use of LiI, $LiNO_3$ or a eutectic mixture such as $LiNO_3$—LiCl;

the method of ion exchange in liquid route through the use, for example, of LiBr or LiI in a solvent.

It is to be noted that the operating conditions of the operation ii) and of the operation iii) do not generally affect the morphology of the mixed carbonate or of the mixed hydroxide obtained in the operation i).

Finally, the method of the invention comprises a synthesis step (step b) of the oxide of formula (II) over all or a portion of the lithiated layered oxide prepared in the step a).

More specifically, this synthesis step b) can include the following operations:

i1) an operation of preparing a solution comprising manganese cations and, where applicable, cations of the element M';

i2) an operation of putting into contact the solution prepared in i1) with the lithiated layered oxide having a stack of the O2 type prepared during the step a) defined hereinabove;

i3) an operation of adding to the mixture obtained in i2) a solution comprising carbonate anions or hydroxide anions and of reacting, with which results the lithiated layered oxide having a stack of the O2 type coated in whole or in part with a carbonate comprising manganese and, where applicable, the element M' or with a hydroxide comprising manganese and, where applicable, the element M';

i4) an oxidation operation of the carbonate comprising manganese and, where applicable, the element M' or hydroxide comprising manganese and, where applicable, the element M', with which there remains the lithiated layered oxide having a stack of the O2 type coated, in whole or in part, with an oxide of the aforementioned formula (II).

Regarding the operation i1), the latter can be, more precisely, implemented by dissolution of a manganese salt and, where applicable, of a M' salt in water, said salt able to be, advantageously, a sulphate, a nitrate or a chloride. The concentration of the solution substantially depends on the desired lithiated layered oxide/coating ratio.

In order to facilitate the dissolution, the resulting solution can be heated under agitation, for example at 60° C.

To this solution is added, then, as defined in the operation i2), the lithiated layered oxide having a stack of the O2 type then, to the resulting mixture, in accordance with the operation i3), a solution comprising carbonate anions or hydroxide anions. This latter solution can be prepared beforehand by dissolution of a salt comprising carbonate anions (for example, sodium carbonate $Na_2CO_3$) or hydroxide anions (for example, sodium hydroxide NaOH) in water. The concentration of the latter solution can be chosen, advantageously, in such a way that the $Co_3^{2-}$ or $OH^-$ ions can react, in a stoechiometric manner, with the manganese cations and the cations of the element M' in order to form a carbonate that comprises manganese and, where applicable, the element M' or a hydroxide comprising manganese and, where applicable, the element M' that is formed on all or a portion of the lithiated layered oxide having a stack of the O2 type.

This operation i3) can be carried out under strong agitation at a temperature and a duration that are effective for obtaining the reaction between the carbonate ions and the manganese ions and, where applicable, the ions of the element M' (for example, at a temperature of 60° C. for 4 hours).

The mixture coming from the operation i3) can then be subjected to a filtration, with the retentate then being subjected to a washing, for example, with distilled water then dried, for example, under air or in a vacuum, in an oven at 120° C. for one night. This results in a powder formed of the lithiated layered oxide having a stack of the O2 coated in whole or in part with a carbonate comprising manganese and, where applicable, the element M' or with a hydroxide comprising manganese and, where applicable, the element M'.

Said lithiated layered oxide thus coated is subjected to an oxidation operation of the carbonate comprising manganese and, where applicable, the element M' or hydroxide comprising manganese and, where applicable the element M', with which there remains the lithiated layered oxide having a stack of the O2 type coated, in whole or in part, with an oxide of the aforementioned formula (II).

This oxidation operation is carried out under air in conditions of temperature and of duration, that preserve the lithiated layered oxide having a stack of the O2 type, i.e. that do not induce any structural modification of the latter for example by transforming the structural type of the latter, such as a change of the O2 type to the O3 type.

By way of example, when the oxide compound of formula (II) represents 3 mol % with respect to the lithiated layered oxide of formula (I), the operation is carried out, preferably, under air at a temperature of 400° C. maintained for 5 minutes.

Other characteristics shall appear better when reading the following description supplement, which relates to examples for manufacturing materials in accordance with the invention.

Of course, the following example are provided only for, the purposes of illustration of the object of the invention and do not form in any way a limitation of this object.

DETAILED DISCLOSURE OF PARTICULAR EMBODIMENTS

Example 1

Figure 1:
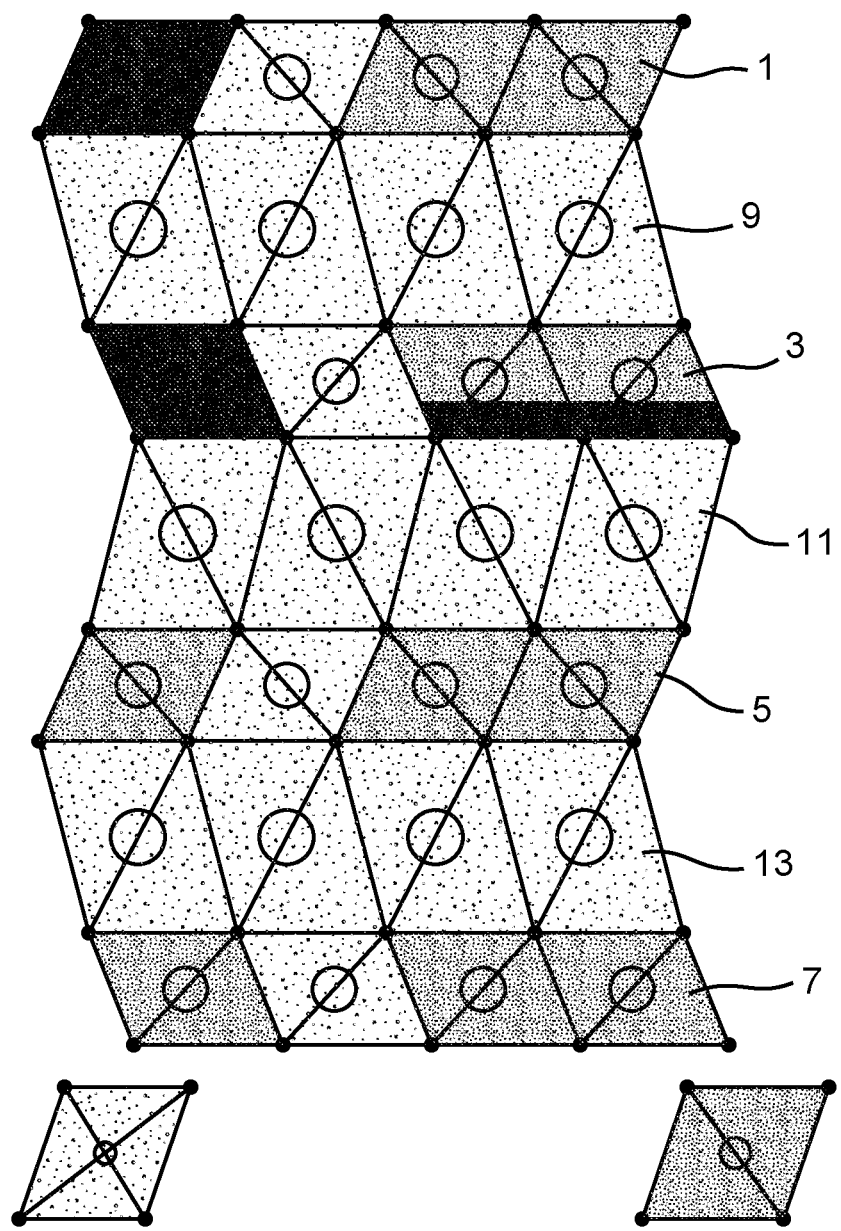
FIG. 1 is a diagram that shows a stack of the O2 type in accordance with the invention.

This example shows the preparing of a material in accordance with the invention with formula $Li_{1.2}Ni_{0.2}Mn_{0.6}O_2$ (or a=1; b=0.2; c=0.2; d=0.6 and g=2) comprising the following steps:

a step of preparing a mixed carbonate of formula $Ni_{0.25}Mn_{0.75}CO_3$ by coprecipitation (step a);

a step of preparing a layered oxide of formula $Na_{0.7}Li_{0.16}Ni_{0.2}Mn_{0.6}O_2$ having a stack of the P2 type (step b);

a step of preparing a layered oxide of formula $Li_{1.2}Ni_{0.2}Mn_{0.6}O_2$ having a stack of the O2 type (step c);

a step of depositing a layer of manganese carbonate on the layered oxide prepared in the preceding step (step d); and an oxidation step of the layer of $MnCO_3$ in order to obtain a layer of manganese oxide $MnO_2$ (step e).

a) Preparation of a Mixed Carbonate of Formula $Ni_{0.25}Mn_{0.75}CO_3$ by Coprecipitation To do this, in a first step, a solution of manganese sulphate and of nickel is prepared by dissolution, in 200 mL of water, of nickel sulphate $NiSO_4*6H_2O$ (26.6 g) and of manganese sulphate $MnSO_4*H_2O$ (51.2 g).

In parallel, another solution is prepared by dissolution of sodium carbonate $Na_2CO_3$ (42.4 g) in water (200 mL) then the adding of ammonia (solution at 28%) (10 g).

In a reactor of the CSTR type, 500 mL of water is introduced and it is heated to 50° C. Then, the solution of nickel sulphate and of manganese sulphate is continuously injected into the reactor. The pH of the reactor is adjusted to 7.5 by adding the other solution. During the entire synthesis duration, namely, for 8 hours the agitation speed in the reactor is maintained at 100 rpm, which is a dissipated power of 2.0 W/m³.

At the end of the synthesis duration, the mixed carbonate thus obtained and which precipitated in the reactor is subjected to a centrifugation and is set to dry in a vacuum for one night. This results in a material in the form of a powder.

b) Step of Preparing a Layered Oxide of Formula $Na_{0.7}Li_{0.16}Ni_{0.2}Mn_{0.6}O_2$ having a Stack of the P2 Type 3 g of carbonate of formula $Ni_{0.25}Mn_{0.75}CO_3$ are mixed with the mortar with 0.38 g of $Li_2CO_3$ and 2.75 g of $Na_2CO_3$. The mixture is then introduced into a crucible then calcinated at 500° C. for 8 hours. The powder is then recovered and is ground again with the mortar. The powder is then put back into the crucible and the material is again calcinated at 800° C. for 8 hours. The material thus created following this treatment is a layered oxide of the structural type P2 of formula $Na_{0.7}Li_{0.46}Ni_{0.2}Mn_{0.6}O_2$.

c) Step of Preparing a Layered Oxide of Formula $Li_{1.2}Ni_{0.2}Mn_{0.6}O_2$ having a Stack of the O2 Type 2 g of $Na_{0.7}Li_{0.16}Ni_{0.2}Mn_{0.06}O_2$ are mixed with the mortar with 8.575 g of $LiNO_3$ and 0.7189 g of $LiCl$. The mixture is then placed in a crucible and is heated at 280° C. for 2 hours in order to carry out the exchange of the sodium with lithium. The powder recovered is then abundantly washed with water at 80° C. on a Büchner. The powder is then dried for one night in a vacuum at 70° C. The dry product obtained thus corresponds to a layered oxide of the structural type O2 of formula $Li_{1.2}Ni_{0.2}Mn_{0.6}O_2$.

d) Step of Depositing a Layer of Manganese Carbonate $MnCO_3$ on the Layered Oxide Prepared in the Preceding Step In a beaker, 0.31 g of $MnSO_4 \cdot H_2O$ are dissolved in 100 mL of water. The temperature of the solution is then raised to 60° C. 5 grams of $Li_{1.2}Ni_{0.2}Mn_{0.6}O_2$ of structural type O2 are introduced into the solution and the whole is agitated very vigorously. In another solution, 0.20 g of $Na_2CO_3$ are dissolved in 100 mL of water. This solution is then added drop by drop to the solution containing the layered oxide of structural type O2. The agitation and the temperature are maintained four hours after the complete adding of the solution of sodium carbonate. The powder is then filtered and washed on a Büchner with water. The powder is then dried at 70° C. in a vacuum in order to prevent oxidising the layer of manganese carbonate formed.

e) Oxidation Step of the Layer of $MnCO_3$ in Order to Obtain a Layer of Manganese Oxide $MnO_2$ In the step d), a layered oxide of the structural type O2 is obtained coated with a layer of $MnCO_3$. The powder obtained is then fractionated into several lots which are calcinated, under air, at 400° C. for different durations (0 min, 5 min, 15 min and 30 min).

This generates results obtained by the scattering of X rays that there are peeks that correspond to a stack of type O3 pour a heat treatment of 400° C. starting at 15 minutes, with the proportion of this type of stack increasing again when the duration is 30 minutes.

For a duration of 5 minutes, there is no material that has a stack of type O3 but only a stack of the O2 type, with this material thus being in accordance with the invention.

Example 2

In this example the electrochemical performance is tested of four materials, which are as follows:
- a material consisting of the powder obtained at the end of the step c) of the example 1 (referred to as the first material or also as the host material);
- a material consisting of the powder obtained at the end of the step e) of the example 1 with a heat treatment of 400° C. for 5 minutes (referred to as the second material or material in accordance with the invention);
- a material consisting of the powder obtained at the end of the step e) of the example 1 with a heat treatment of 400° C. for 15 minutes (referred to as the third material); and
- a material consisting of the powder obtained at the end of the step e) of the example 1 with a heat treatment of 400° C. for 30 minutes (referred to as the fourth material).

To do this, it was elaborated, using the aforementioned materials, button cells comprising the following elements:
- a circular positive electrode of a diameter of 14 mm formed of a collector of courant made of aluminium of which the upper face is coated with a mixture comprised of the first, second, third or fourth material (80% mass) with 10% carbon conducting additive and 10% polyvinylidene fluoride (PVDF);
- a negative electrode of a diameter of 14 mm formed from metallic lithium;
- between said positive electrode and said negative electrode, a separator soaked with an electrolyte (1 mol/L $LiPF_6$ in EC/PC/DMC according to a volume ratio of 1/1/3), EC corresponding to ethylene carbonate, PC to propylene carbonate and DMC to dimethyl carbonate.

Figure 2:
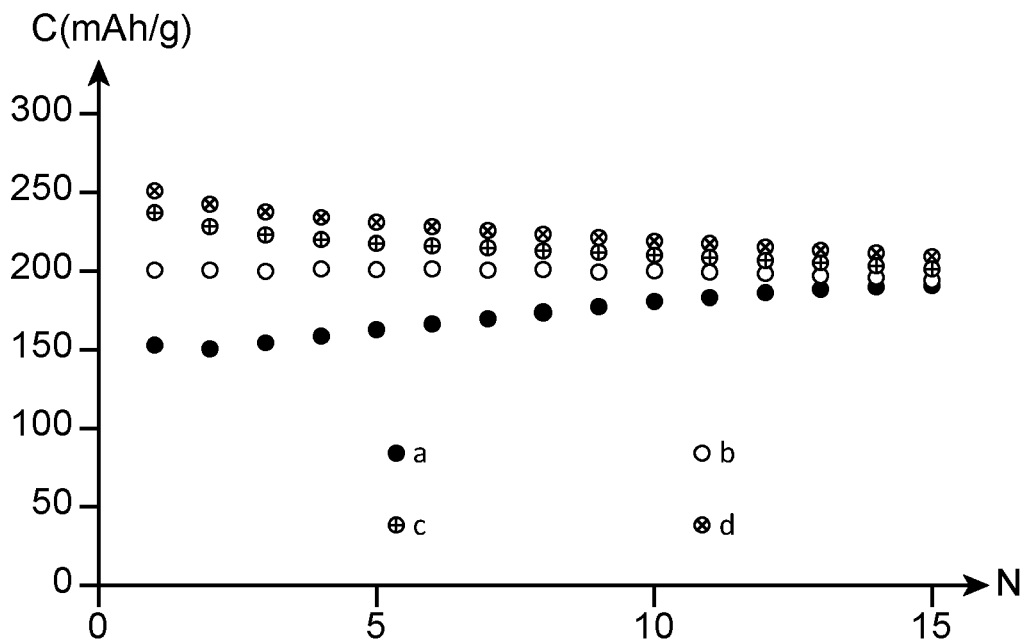
FIG. 2 is a graph that shows the change in the specific capacity C (in mAh/g) according to the number of cycles N of different materials described in accordance with the example 2.
Figure 3:
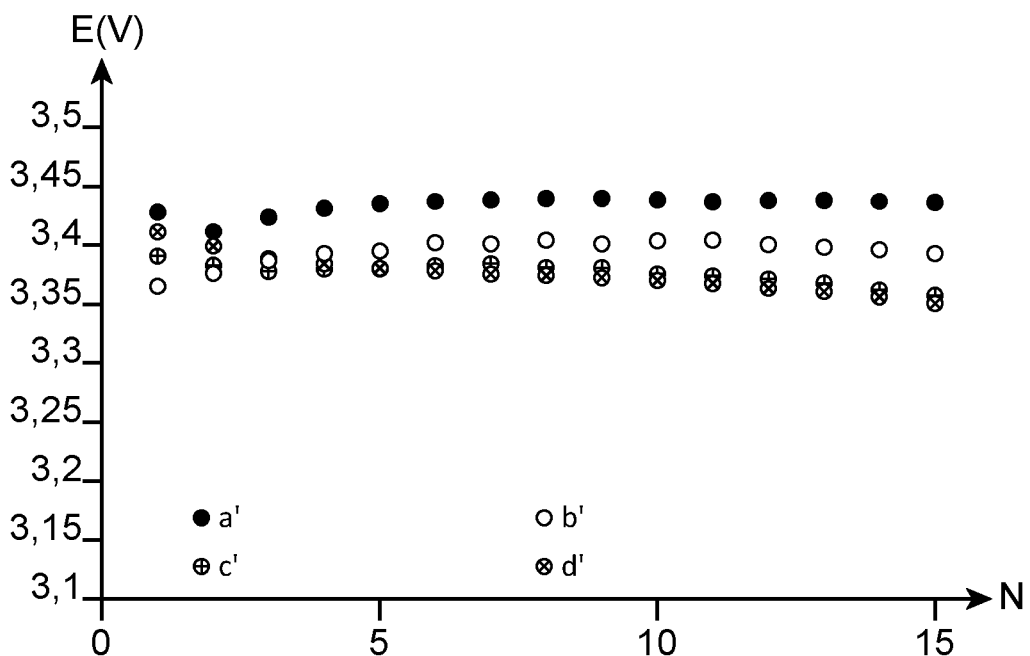
FIG. 3 is a graph that shows the change in the potential (in V) according to the number of cycles N of different materials described in accordance with the example 2.

The pile thus prepared undergoes a cycling sequence (15 cycles) and the change in the capacity (in mAh/g) is determined according to the number of cycles, with the results being listed in the accompanying FIG. 1 in the appendix (curves a) to d) for respectively the first material, the second material, the third material and the fourth material) and also the change in the potential (in V) according to the number of cycles, with the results listed in the accompanying FIG. 2 in the appendix (curves a') to d') pour respectively the first material, the second material, the third material and the fourth material).

From the curve a), this shows that the first material or host material has performance of about 200 mAh/g after 15 cycles, which corresponds to a long activation time. The curve a') also makes it possible to arrive at the same conclusion in terms of activation time, because the potential also stabilises rather slowly.

For the curves c) and d) and c') and d'), an increase in the capacity is observed but especially a drop in the average potential during cycling, which can be explained by the fact that a non-negligible portion of the oxide having a stack of the O2 type was transformed into oxide having a stack of the O3 type.

Finally, for the curve b) and the curve b'), a capacity of 200 mAh/g is observed right from the first cycles and a stability of the potential during cycling, which attests to the superiority of the material in accordance with the invention in relation to the other materials.

What is claimed is:

1. Positive electrode material for a lithium battery comprising a lithiated metal layered oxide comprising one or more metal elements arranged in the form of layers of metal cations and lithium arranged in interlayers of lithium cations and, in part, in the layers of metal cations, said interlayers ensuring the separation between said layers, said oxide having a stack arrangement O2 and corresponding to the following formula (I):

$$Li_{(a+b)}Ni_cMn_dCo_eM_fO_g \qquad (I)$$

wherein:
*a represents the proportion of lithium included in the interlayers and being greater than 0 and less than or equal to 1;
*b represents the proportion of lithium included in the layers of metal cations and being greater than 0 and less than or equal to ($\frac{1}{3}$);
*c, d, e and f are of from 0 to 1, with the condition that b+c+d+e+f=1, in such a way that the electroneutrality of the oxide of formula (I) is respected;
*g is between 1.9 and 2.1;
*when f is different from 0, M is at least one element selected from Al, Fe, Ti, Cr, V, Cu, Mg, Zn, Na, K, Ca, Sc and the combinations thereof;
characterised in that said oxide is coated, in whole or in part, with an oxide of the following formula (II):

$$Mn_hM'_iO_2 \qquad (II)$$

wherein:
*0<h≤1.5;
*M' is at least one element selected from Ni, Al, Fe, Ti, Cr, V, Cu, Mg, Zn, Na, K, Ca, Sc
*0≤i≤1.5.

2. Material according to claim 1, wherein e and f are equal to 0, in which case the lithiated layered oxide corresponds to the following formula (III):

$$Li_{(a+b)}Ni_cMn_dO_g. \qquad (III)$$

3. Material according to claim 1, wherein the lithiated layered oxide corresponds to the following formula (IV):

$$Li_{1.2}Ni_{0.2}Mn_{0.6}O_2. \qquad (IV)$$

4. Material according to claim 1, wherein (a+b) is greater than 1, in which case the layered oxide belongs to the category of overlithiated layered oxides.

5. Material according to claim 1, wherein h is equal to 1 and i is equal to 0, in which case the oxide covering the lithiated layered oxide is manganese oxide $MnO_2$.

6. Material according to claim 1, wherein the material has the form of particles formed by the lithiated layered oxide having a stack of the O2 type, said particles being coated with a layer of coating formed by the oxide of formula (II).

7. Lithium battery comprising at least one electrochemical cell comprising an electrolyte arranged between a positive electrode and a negative electrode, said positive electrode comprising a positive electrode material such as defined according to claim 1.

8. A method for preparing a positive electrode material for a lithium battery comprising a lithiated metal layered oxide comprising one or more metal elements arranged in the form of layers of metal cations and lithium arranged in interlayers of lithium cations and, in part, in the layers of metal cations, said interlayers ensuring the separation between said layers, said oxide having a stack arrangement O2 and corresponding to the following formula (I):

$$Li_{(a+b)}Ni_cMn_dCo_eM_fO_g \qquad (I)$$

wherein:
*a represents the proportion of lithium included in the interlayers and being greater than 0 and less than or equal to 1;
*b represents the proportion of lithium included in the layers of metal cations and being greater than 0 and less than or equal to ($\frac{1}{3}$);
*c, d, e and f are of from 0 to 1, with the condition that b+c+d+e+f=1, in such a way that the electroneutrality of the oxide of formula (I) is respected;
*g is between 1.9 and 2.1; for example, is equal to 2;
*when f is different from 0, M is at least one element selected from Al, Fe, Ti, Cr, V, Cu, Mg, Zn, Na, K, Ca, Sc and the combinations thereof;
said oxide being coated, in whole or in part, with an oxide of the following formula (II):

$$Mn_hM'_iO_2 \qquad (II)$$

wherein:
*0<h≤1.5;
*M' is at least element selected from Ni, Al, Fe, Ti, Cr, V, Cu, Mg, Zn, Na, K, Ca, Sc;
*0≤i≤1.5;
said method comprising the following steps:
a) a synthesis step of the lithiated layered oxide having a stack of the 02 type;
b) a synthesis step of the oxide of formula (II) over all or a portion of the lithiated layered oxide.

9. The method according to claim 8, wherein the synthesis step b) comprises the following operations:
i1) an operation of preparing a solution comprising manganese cations and, where applicable, cations of the element M';
i2) an operation of putting into contact the solution prepared in i1) with the lithiated layered oxide having a stack of the O2 type prepared during the step a);
i3) an operation of adding to the mixture obtained in i2) a solution comprising carbonate anions or hydroxide anions and of reacting, with which results the lithiated layered oxide having a stack of the O2 type coated entirely or partially with a carbonate comprising manganese and, where applicable, the element M' or with a hydroxide comprising manganese and, where applicable, the element M';

i4) an oxidation operation of the carbonate comprising manganese and, where applicable, the element M' or hydroxide comprising manganese and, where applicable, the element M', with which there remains the lithiated layered oxide having a stack of the O2 type coated, in whole or in part, with an oxide of the aforementioned formula (II).

10. The method according to claim 9, wherein the oxidation operation is carried out under air in conditions of temperature and of duration, that preserve the lithiated layered oxide having a stack of the O2 type.

11. The method according to claim 10, wherein the oxidation operation is carried out at 400° C. for 5 minutes.

12. The method of claim 8, wherein the synthesis step a) comprises the following:
i) preparing a mixed hydroxide comprising elements other than Li by contacting, under agitation, cations of the elements other than Li with hydroxide anions;
ii) preparing an oxide of formula $Na_xLi_yNi_cMn_dCo_eM_fO_g$ with x being between 0 and 1 and y being between 0 and 1, said oxide having a stack of the P2 type, by reacting the mixed hydroxide obtained in step i) with a lithium hydroxide and sodium hydroxide mixture; and
iii) exchanging the sodium of the oxide obtained in step ii) with lithium to form the lithiated layered oxide having a stack of the O2 type corresponding to formula (I).

* * * * *